June 29, 1943.  W. Y. LANG  2,322,943

TELEGRAPH SIGNAL MEASURING APPARATUS

Filed Aug. 22, 1941  2 Sheets—Sheet 1

INVENTOR
W. Y. LANG
BY
J. W. Schmied
ATTORNEY

June 29, 1943.   W. Y. LANG   2,322,943
TELEGRAPH SIGNAL MEASURING APPARATUS
Filed Aug. 22, 1941   2 Sheets-Sheet 2
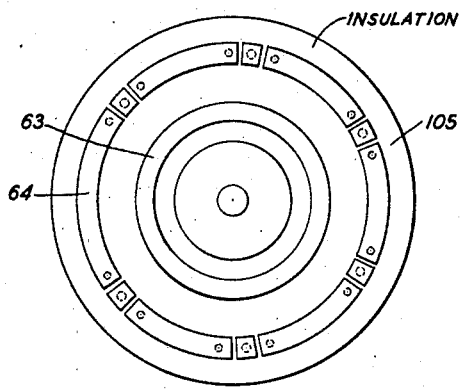
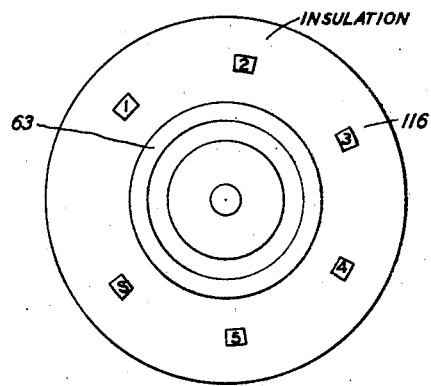
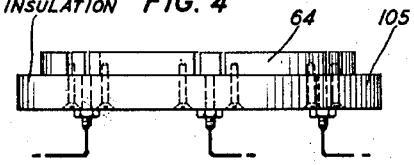
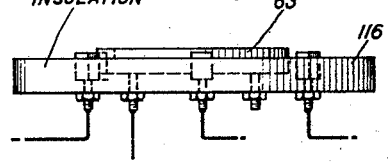
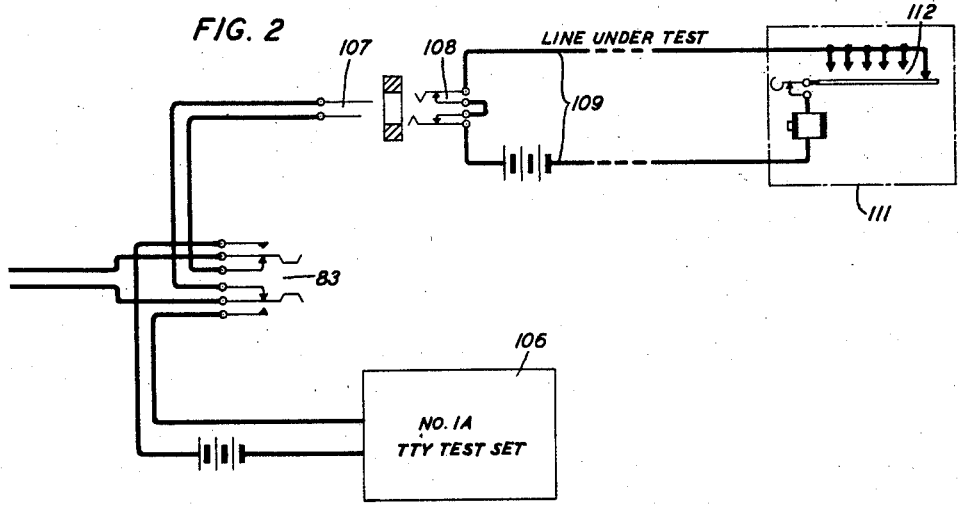
INVENTOR
W. Y. LANG
BY
ATTORNEY Patented June 29, 1943

2,322,943

UNITED STATES PATENT OFFICE 2,322,943

TELEGRAPH SIGNAL MEASURING APPARATUS

Wilmarth Y. Lang, Towaco, N. J., assignor to Bell Telephone Laboratories, Incorporated, New York, N. Y., a corporation of New York Application August 22, 1941, Serial No. 407,845

12 Claims. (Cl. 178—69)

This invention relates to testing instrumentalities and particularly to a telegraph signal measuring device.

An object of the invention is to provide a telegraph signal distortion measuring set which affords direct readings of signal distortion measurements in terms of percentages of signal pulse lengths.

Another object of the invention is to provide a telegraph signal distortion measuring device which may be easily calibrated and readily rechecked for calibration by methods substantially identical with those employed in making the signal distortion measurements.

The invention features movable direct-reading scales which may be adjusted as part of the calibrating procedure to establish zero positions, whereby the direct reading of magnitudes of distortion is afforded.

The invention also features a rotary brush and segmented ring type of receiving distributor in which the positions of the rings are fixed and the stop position of the brushes is variable for orientation adjustment purposes.

Briefly, the invention contemplates a brush and segmented ring type of receiving distributor, the brush arm of which is driven through a friction clutch from a continuously driven shaft. Arrestment of the brush arm for operation in start-stop manner is effected through a stop arm associated with the driven portion of the clutch assembly and cooperating with a stop gate which is carried by an orientation adjustment device and is controlled by a start magnet. The stop gate is movable through an arc which has its center on the axis of the distributor brush shaft and movement of the stop gate assembly is accomplished through a worm and sector gear operated by a crank. An indicator pointer is carried by the stop gate adjusting assembly and indicates on a fixed scale the exact position of the stop gate. Movable scales having graduations upon the same basis as those on the fixed scale are provided, and each of the movable scales has its graduations numbered in both directions from zero. The stop gate position indicator extends over the movable scales as well as over the fixed scale and by means of the movable scales two positions of the stop gate position indicator may be temporarily indicated as zero reference positions, one to indicate the beginning of impulses having zero distortion and the other to indicate the end of impulses having zero distortion. With the two movable scales thus positioned other positions of the stop gate position indicator may be read on the movable scales as lengthening or shortening of impulses relative to undistorted impulses in percentages of impulse lengths. Switching means is provided for enabling observations to be made with reference to any one impulse of a signaling code or combinations of impulses. Switching means is also provided for enabling observations to be made of transitions from marking to spacing or from spacing to marking selectively.

For a complete understanding of the invention reference may be had to the following detailed description to be interpreted in the light of the accompanying drawings wherein:

Fig. 2 is an electrical circuit diagram showing source of calibrating signals and signals to be measured;

Fig. 3 is a plan view showing structural details of the distributor face shown in Fig. 1;

Fig. 4 is an elevational view of the distributor face shown in Fig. 3;

Fig. 5 is a plan view of a modified distributor face; and

Fig. 6 is an elevational view of the distributor face shown in Fig. 5.

Figure 1:
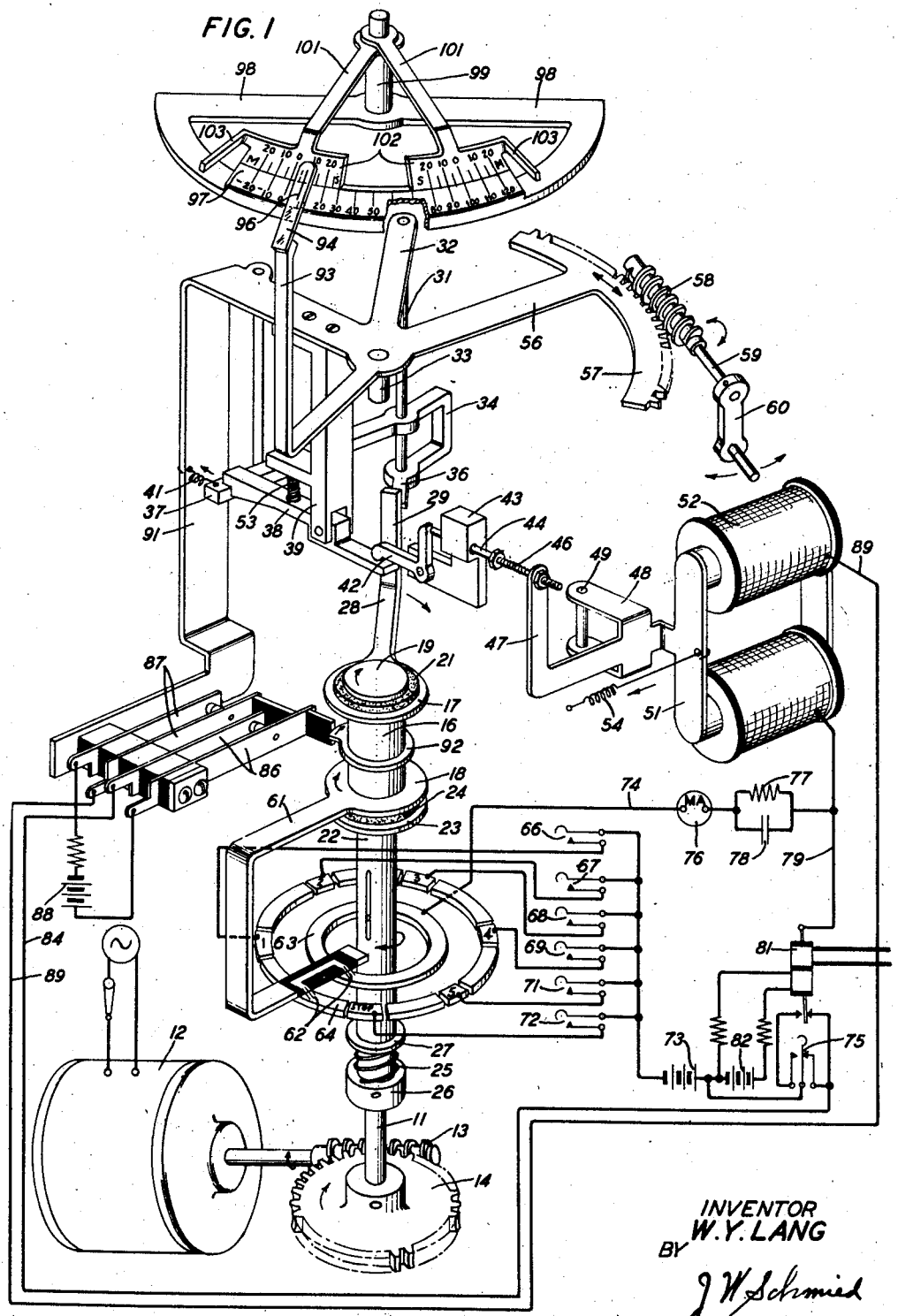
Fig. 1 is a combined exploded perspective view and electrical wiring diagram of a signal measuring device according to the present invention.

Referring now to Fig. 1 the reference numeral 11 designates a shaft which is continuously driven from motor 12 through worm 13 and worm wheel 14. Shaft 11 has sleeved thereon a cylinder 16 which has upper and lower end flanges 17 and 18 respectively. Shaft 11 has secured to the upper end thereof a disc 19, and an annulus 21 of compressible friction material such as felt is disposed between disc 19 and flange 17 of cylinder 16. Below the flange 18 of cylinder 16 shaft 11 has slidably keyed thereto a sleeve 22 which carries at its upper end a disc 23. An annulus 24 of friction material similar to the annulus 21 is disposed between flange 23 of sleeve 22 and flange 18 of cylinder 16. A compression spring 25 is confined between a collar 26 secured to shaft 11 and a flange 27 at the lower end of sleeve 22, and the spring 24 urges sleeve 22 upwardly of shaft 11 to apply pressure between flange 23, annulus 24 and flange 18 and between flange 17, annulus 21 and disc 19. Since disc 19 is secured to shaft 11 and flange 23 is connected to the shaft through sleeve 22 these elements rotate continuously with the shaft and serve as the driving elements of a friction clutch to impart rotation to cylinder 16 through flanges 17 and 18 and through the annuli 21 and 24 when cylinder 16 is not externally blocked against rotation.

Flange 17 of cylinder 16 is provided with a radially extending arm 28 at the free end of which is a vertically extending portion 29, and the arm 28 with its vertical portion 29 serves as a stop arm for the frictionally driven cylinder 16. Just outside the arc through which portion 29 of stop arm 28 rotates a pivot rod 31 depends from an orientation adjustment support 32 which is pivotally movable about a pivot 33 which is coaxial with shaft 11. Pivot rod 31 pivotally supports a stop gate 34 which has an arm 36 extending into the path of the vertically extending portion 29 of stop arm 28 and which also has an arm 37 the free end of which is presented near the left-hand end of a lever 38 pivotally supported by a bracket 39 which is secured to and depends from suport 32. The left-hand end of lever 38 is undercut to provide a shoulder which will block arm 37 of stop gate 34, and thus the stop gate, against counter-clockwise rotation when lever 38 is in extreme counter-clockwise position with its shoulder presented in the path of arm 37 of the stop gate. A tension spring 41 biases stop gate 34 in clockwise direction, and when arm 37 of the stop gate is blocked by the shoulder of lever 38, arm 36 of the stop gate is disposed in the path of portion 29 of the stop arm 28 and holds cylinder 16 against rotation, its direction of rotation being clockwise.

Disposed above the right-hand end of lever 38 at a point coaxial with the axis of shaft 11 is the free end of one arm of a bell crank lever 42 which is pivotally carried by a fixed bracket 43. The bracket 43 slidably supports a pusher pin 44, one end of which engages the other arm of bell crank lever 42 and the other end of which is engaged by an adjustable abutment screw 46 carried by an arm 47 of an armature lever 48 which is pivoted at 49. Armature lever 48 has secured thereto the armature 51 of an electromagnet 52 which serves as a start magnet for cylinder 16 to control rotation of the cylinder in start-stop manner.

When electromagnet 52 is energized and holds its armature 51 attracted, abutment screw 46 is retracted from engagement with pin 44 and a compression spring 53 which is confined between the left-hand arm of lever 38 and a portion of bracket 39 urges lever 38 into blocking relation to arm 37 of stop gate 34, and this is the extreme counter-clockwise position of lever 38, since the overhanging portion at the left-hand end engages the upper surface of arm 37 of the stop gate. Lever 38, when in the extreme counter-clockwise position holds bell crank 42 in extreme clockwise position and in this position the left-hand end of pusher pin 44 loosely engages an arm of bell crank lever 42 but exerts no force upon it since abutment screw 46 is retracted from engagement with pin 44.

When magnet 52 becomes deenergized its armature lever rocks in clockwise direction and abutment screw 46 pushes pin 44 leftwardly as viewed in Fig. 1 thus rocking bell crank lever 42 in counter-clockwise direction. The bell crank in turn rocks lever 38 in clockwise direction, spring 53 yielding to permit the rotation, and the blocking shoulder of lever 38 is lifted out of blocking relation to the outer end of arm 37 of the stop gate 34. It will be understood that a tension spring 54 which biases armature lever 48 to its extreme clockwise or released position exerts sufficient force to overcome the effect of compression spring 53 and to rock lever 38 clockwise. Since a torque is continuously applied to cylinder 16 by shaft 11 the stop arm 28 exerts a force against the arm 36 of stop gate 34 and tends to rock the stop gate in counter-clockwise direction. The force exerted by stop arm 28 is considerably greater than that exerted by tension spring 41 upon arm 37 of stop gate 34 and when arm 37 is released by lever 38 stop arm 28 overcomes the effect of tension spring 41 and rocks the stop gate 34 in counter-clockwise direction until the vertically extending portion 29 of arm 28 has escaped from arm 29 of the stop gate, whereupon spring 41 restores stop gate 34 to extreme clockwise position. Since the point of cooperation of bell crank 42 with lever 38 is coaxial with shaft 11, the entire assembly comprising support 32, pivot rod 31, stop gate 34, bracket 39 and lever 38 may be revolved about pivot 33 without in any way disturbing the operating relation of bell crank 42 to lever 38, and bell crank 42 will operate the lever 38 regardless of the magnitude of the angle through which lever 38 may be revolved about the axis of shaft 11 as support 32 is revolved. The only effect of changing the position of support 32 will be to change the stop position of stop arm 28 and the cylinder 16 by which it is carried.

Support 32 is provided with an arm 56 which carries at its free end a gear segment 57 with which a worm 58 is meshed. Worm 58 is secured to a shaft 59 to one end of which is secured a hand crank 60 by means of which worm 58 may be rotated to cause pivotally mounted support 32 to revolve about its pivot to vary the position of stop gate 34 and thus to vary the stop position of cylinder 16. With the exception of gear segment 57 and crank operated worm 58, the structure thus far described is generally similar to the single magnet start-stop telegraph signal receiving distributor such as that shown in Patent 1,904,164 granted April 18, 1933, to F. Morton et al. and the pertinent portion of the disclosure of that patent is incorporated herein by reference as a part of this specification.

The cylinder 16 is in fact the rotary element of a telegraph signal receiving distributor but whereas that shown in the patent above identified is a mechanical distributor, the distributor contemplated herein is an electrical or brush type of distributor and, accordingly, the cylinder 16 has secured thereto a radially extending arm 61 which carries electrically interconnected brushes 62, the brushes being insulated from the arm 61. In the drawing, the brushes 62 are shown as being carried by a depending extension of arm 61, but such extension has been employed in the drawings merely for the purpose of enabling the parts to be spread or expanded in exploded manner in order that all portions of the drawing will be clearly understandable, and in an actual construction of apparatus according to the invention the brushes 62 may be mounted directly on the radially extending arm 61.

One of the brushes 62 continuously engages the surface of a continuous conductive signal receiving ring 63 and the other of the brushes 62 engages the surface of a segmented signal distributing ring 64. Segmented ring 64 has five very short conductive segments numbered 1, 2, 3, 4 and 5 and a similar short conductive "stop" segment. Each of the segments 1 to 5, inclusive, represents only a small fraction of the corresponding impulse of a code signal and the "stop" segment represents only a small fraction of the stop impulse. However, the spacing of the short segments corresponds to the spacing of the receiving segments of an ordinary brush type start-stop signal receiving distributor. It follows from this that the angle occupied by a numbered segment plus the angle occupied by the segment intervening it and the next numbered segment is equal to the angle occupied by a code impulse segment of an ordinary brush type start-stop receiving distributor. The intervening segments, if of conductive material, are electrically isolated from the numbered segments and have no circuit connections associated with them, or the intervening segments may be of non-conductive material.

Each of the numbered segments and the "stop" segment is connected to one contact of an individual manually operable key and the keys are designated by the reference numerals 66, 67, 68, 69, 71 and 72 for the segments 1, 2, 3, 4 and 5 and the stop segment, respectively. The other contact of each of the manually operable keys is connected to one terminal of battery 73 the other terminal of which is connected to the swinger of a manually operable double-throw key 75. The continuous conductive ring 63 is connected by conductor 74 to one terminal of a current flow indicating device 76, such as a milliammeter, the other terminal of which is connected to one side of a condenser 78 which is shunted by a resistor 77. The other side of the condenser 78 is connected by conductor 79 to the armature of a polarized telegraph line relay 81. The biasing winding of line relay 81 is connected to the terminals of battery 82 and the marking and spacing contacts of the line relay which are the right and left-hand contacts, respectively, are connected to the right and left-hand contacts, respectively, of the double-throw key 75. The terminals of the operating winding of relay 81 are connected to the two swingers of a double-pole double-throw manually operable key 83 (Fig. 2).

The marking contact of line relay 81 is also connected by conductor 84 to one contact spring of a pair of contacts 86 which is ganged to a pair of contacts 87. The other spring of the pair of contacts 86 is connected to one terminal of battery 88. The other terminal of battery 88 is connected to one of the springs of the pair of contacts 87 and the other spring of that pair is connected by conductor 89 to one terminal of start magnet 52, the other terminal of which is connected by conductor 79 to the armature of line relay 81.

The two pairs of contacts 86 and 87 are mounted on a bracket 91 which is carried by the stop gate support 32. From this it will be apparent that when the support 32 is revolved about its pivot 33 through the operation of crank 60 to vary the position of stop gate 34, the contacts 86 and 87 will move through a corresponding arc. A cam 92 secured to the brush driving cylinder 16 has a single apex which is arranged to close the two pairs of contacts 86 and 87 once in each revolution of the cylinder 16. As shown in Fig. 1, when the stop gate 34 is holding cylinder 16 arrested, the apex of cam 92 is presented to the operating block for the contacts 86 and 87 and holds the contacts closed. Since the angle through which the operating block for the ganged contacts 86 and 87 moves when support 32 is moved, is proportional to the angle through which stop gate 34 is moved, it will be apparent that contacts 86 and 87 are always positioned to be closed when stop gate 34 arrests cylinder 16.

The cam 92 prepares an energizing circuit for the stop magnet 52 by closing the contacts 86 and 87 shortly before cylinder 16 reaches its stop position, and when the armature of line relay 81 moves into engagement with the right-hand or marking contact in response to the stop impulse, the circuit of magnet 52 is completed and the magnet becomes energized to attract its armature, thus retracting abutment screw 46 away from pusher pin 44 and permitting lever 38 to rock into blocking relation to arm 37 of stop gate 34. By virtue of the provision of contacts 86 and 87, start magnet 52 does not follow a received signal and become energized each time the armature of line relay 81 engages its marking contact, but remains deenergized throughout the reception of the code impulses of a signal and becomes energized to effect the arrestment of cylinder 16 when the start impulse is received or possibly near the end of the fifth code impulse of a received signal if that impulse is of marking nature and if the apex of cam 16, although it is very short, is long enough to close contacts 86 and 87 before the end of the fifth code impulse.

For giving an indication of the stop position of cylinder 16 and brush arm 61, upon which the phase relation of received signaling impulses to the passage of the brushes over the numbered segments depends, the support 32 for stop gate 34 has secured thereto an upwardly extending arm 93 which carries at its upper end an indicator pointer 94. In the embodiment of the invention shown in the drawings, the pointer 94 has been shown as a thin flat strip of transparent material such as glass or plastic on which has been inscribed a relatively fine indicator line 96. Pointer 94 is movable with support 32 along an arcuate scale 97 carried by arms 98 secured to a post 99 which is preferably coaxial with shaft 11. Post 99 is preferably rigidly mounted and arms 98 are rigidly connected to post 99 so that scale 97 is permanently stationary.

Post 99 pivotally supports arms 101 which have depending from their foremost ends short scales 102 which rest on the upper surface of scale 97 and are disposed with their surfaces in registry with that of scale 97 and having the same slope. Since arms 101 are pivotally mounted on post 99 the scales 102 are movable in an arcuate path along and with reference to stationary scale 97 and each of the scales 102 is provided with a handle 103 by which it may be moved. Preferably the hubs of arms 101 engage the post 99 somewhat snugly so that there is sufficient friction developed to cause the scales 102 to remain in any position in which they are placed, or, alternatively, the arms 101 may be of spring material and may be so positioned on post 99 as to urge the scales 102 downwardly into engagement with the upper edge of scale 97 to develop friction between the movable and fixed scales which will resist movement of the scales.

The fixed scale 97 has been shown as having graduations from negative 20 to positive 120. These graduations represent percentages of a normal pulse length. The portion of the scale from zero to 100 represents a full normal signaling impulse and the angle between these two values on the scale corresponds to the angle of spacing of the numbered segments of segmented ring 64. The values below zero or beyond 100 would therefore represent lengthening of signaling impulses on one end or the other. Each of the movable scales 102 has graduations according to the same scale as the fixed scale and on these movable scales the zero occurs about the middle of the scale. On each side of the zero the graduations are numbered progressively to any convenient extent such as 20 per cent, and it will be apparent that the graduations in one direction are negative with respect to graduations in the other direction.

In order to use the signal receiving device hereinbefore described for measuring telegraph signaling impulses it is first necessary to calibrate the device. For this purpose a source of standard or substantially perfect signals is employed and a well-known device of this type is shown in Patent 2,036,059 granted March 31, 1936, to W. Y. Lang. The disclosure of this patent is incorporated herein by reference as a part of this specification. As shown in Fig. 2 a telegraph signal test transmitter for transmitting substantially perfect signals is indicated diagrammatically by the rectangle 106, and its output leads may be connected to the outermost pair of springs of key 83, so that calibrating signals may be applied readily at any time to the line relay 81 by moving the swingers of key 83 into engagement with the outer springs. As shown in Fig. 2, the innermost pair of springs of key 83, which are engaged by the swingers when the key is in normal position, may be connected to a plug 107 which may be inserted into any jack at which a telegraph line to be tested terminates, one such jack being indicated by the reference numeral 108 and having connected to it the telegraph line conductors 109 to the remote end of which is connected a telegraph station 111 including a transmitter 112.

With the swingers of key 83 moved into engagement with the outermost contact springs and with test transmitter 106 in operative condition but at rest, a steady marking condition will be impressed upon its output conductors and through the outermost springs and the swingers of key 83 to the operating winding of line relay 81 so that the armature will engage the right-hand or marking contact. A circuit is thus completed through the armature of line relay 81 and through contacts 86 and 87 to energize the start magnet 52 which locks the stop gate 34 and holds cylinder 16 at rest. Key 75 is closed on the right-hand contact which is the condition shown in Fig. 1, to connect battery 73 to the right-hand or marking contact of line relay 81. Key 66 is also closed but a circuit is not completed across condenser 78 and through current indicating meter 76 because brushes 62 in the stop position of the receiving distributor engage the dead segment of segmented ring 64 between the short "stop" segment and the short segment 1. Test transmitter 106 is then started to transmit repeatedly a test signal, the first significant impulse of which is marking or, alternatively, to transmit miscellaneous matter containing some signals in which the first significant impulse is marking. Line relay 81 responds to the start signal, which is a spacing condition and its armature moves to the left-hand or spacing contact thus interrupting the energizing circuit of start magnet 52 which releases its armature to unlock the stop gate 34 whereby cylinder 16 and with it cam 92 and brush arm 61 are released for rotation. As soon as cylinder 16 begins to rotate the apex of cam 92 moves out of cooperation with the operating block of contacts 86 and 87 and the contacts open to interrupt the energizing circuit for start magnet 52 at that point so that the start magnet will not respond to marking impulses in the signal combination but can be reenergized only in response to the stop impulse at the end of the signal combination.

Assuming that the orientation mechanism which comprises the rotatable support 32 carrying stop gate 34 occupies a random position with brushes 62 ahead of segment 1 which is such that the brushes will reach segment 1 at some time during the first impulse of the test signals, the armature of relay 81 will move back into engagement with its right-hand or marking contact when the marking impulse is received and a circuit will be completed when the brushes 62 reach segment 1 from the right-hand side of battery 73 through the swinger and right-hand contact of key 75, right-hand or marking contact and armature of relay 81, conductor 79, condenser 78, current indicating meter 76, conductor 74, continuous ring 63 and segment 1 of the segmented ring 64 of the distributor and closed key 66 to the left-hand side of battery 73. Through this completed circuit charging current for the condenser 78 will flow and current indicating meter 76 will be deflected to indicate the flow of current. As soon as the brushes 62 leave segment 1 the charging circuit for condenser 78 will be interrupted and the charge on the condenser will leak off through resistor 77. Preferably, the resistance value of resistor 77 is such that condenser 78 becomes discharged before brushes 62 reach segment 2. This provides for the complete dissipation of the charge on condenser 78 so that if key 67 had also been closed and the armature of line relay 81 remained on or arrived at the marking contact while brushes 62 traverse segment 2, the condenser 78 could again become charged and the meter 76 would again be deflected.

The amount of the deflection of meter 76 is not important but the time at which the condenser becomes charged is important because this indicates the time of traversal of the segment 1 by the brushes and may by orientation adjustment be made to indicate the time of the transition of the armature of line relay 81 from its spacing contact to its marking contact in response to the first impulse of the code. Accordingly, the crank 60 may be rotated to shift the position of stop gate 34 and thus to vary the angle through which brushes 62 travel before encountering segment 1. If from the initial random stop position of brushes 62 the support 32 is revolved in clockwise direction slowly, the meter 76 will indicate a flow of current each time that the brushes 62 traverse segment 1, assuming that all signals received have the first impulse marking and the deflection of meter 76 will be caused by successively earlier portions of the marking impulse as the stop gate is moved in clockwise direction. Eventually a point will be reached at which the meter 76 just fails to indicate a flow of current. The interpretation of this condition is that the stop position of the brushes 62 has been advanced in a clockwise direction to a point such that the start impulse terminates and the marking first impulse of the signal begins just as the brushes 62 leave the segment 1. Crank 60 may be rocked back and forth until it has been satisfactorily determined that the departure of brushes 62 from segment 1 just precedes the movement of the armature of line relay 81 into engagement with its marking contact so that the support 32 for stop gate 34 cannot be moved further in counterclockwise direction without causing a charging current circuit for condenser 78 to be completed through segment 1. This establishes a known point of beginning of the marking impulse on the fixed scale 97 and such point should be somewhere in the neighborhood of the zero graduation on that scale. With this adjustment of the apparatus it should be possible to close those of the keys 66, 67, 68, 69, 71 and 72 that correspond to any marking impulse in the received signal that is preceded by a spacing impulse and since the spacing of the numbered segments of distributor ring 64 corresponds to the length of telegraph signaling impulses there should be no deflection of meter 76 for any transition from spacing to marking. If miscellaneous matter signals are supplied by the test transmitter 106 so that transitions from spacing to marking may occur at any point in the signals, any one of the keys 66, 67, 68, 69, 71 and 72 may be closed and no deflection of meter 76 should occur in response to transitions from spacing to marking condition because the spacing of the numbered segments of distributor ring 64 corresponds to the length of individual impulses of a code and the beginning of any marking impulse should occur just after the brushes 62 have left the numbered segments corresponding to that impulse. No two successive ones of the keys 66, 67, 68, 69, 71 and 72 should be closed because any marking impulse which begins just after the brushes 62 have left the numbered segment corresponding to that impulse will end just after or just as the brushes 62 leave the next numbered segment, from which it will follow that the armature of line relay 81 will be in engagement with the marking contact when the brushes 62 encounter such next numbered segment and the charging circuit for condenser 78 will be completed and meter 76 will indicate a flow of current.

When the support 32 for stop gate 34 has been adjusted to indicate a known point for the beginning of marking impulses, the left-hand movable scale 102 is moved to bring its zero graduation into registry with the indicator line 96 on pointer 94. Thus it is not necessary to read exactly the position of line 96 of pointer 94 relatively to the fixed scale 97 since the movable scale 102 establishes the zero point of reference for the pointer 94.

The next step in the calibration of the signal measuring device is to determine the termination of marking impulses on perfect signals. For this purpose the key 66 may remain closed provided some or all of the test signals have the first impulse marking, and the key 75 is shifted to its left-hand contact thereby connecting the right-hand side of battery 73 to the left-hand or spacing contact of relay 81. With this arrangement the battery 73 will become connected through the left-hand contact and the armature of line relay 81 to the right-hand side of condenser 78 on transitions of the line relay from marking to spacing. With the signals being received crank 60 is rotated to move the support 32 for stop gate 34 in counter-clockwise direction, which is opposite to the direction of rotation of cylinder 16 to increase the distance from the stop position of brush arm 61 to segment 1. This delays the interval of traversal of segment 1 by brushes 62 relative to the time of reception of the first impulse of the code and when the stop gate has been moved counter-clockwise to a point at which the end of the first impulse and the transit of the armature of line relay 81 from marking to spacing position occurs, a charging current circuit for condenser 78 will be completed and the meter will register a deflection. Until such deflection begins to occur it will be known to the operator that the segment 1 is being traversed by brushes 62 while the marking impulse is being received because the failure of meter 76 to register a deflection indicates that the armature of line relay 81 is remaining on its marking contact. When deflection of the meter 76 begins to occur, counter-clockwise rotation of support 32 by means of crank 60 is continued until the meter 76 just fails to register a deflection. This indicates that the end of the first or marking impulse occurs just before brushes 62 encounter segment 1 of the receiving distributor and the crank may be rocked back and forth for the purpose of ascertaining that pointer 94 is brought to a position where meter 76 just fails to register a deflection. Thereafter, if desired, any one of the keys 66, 67, 68, 69 or 71 may be closed and with test transmitter 106 transmitting miscellaneous matter signals or transmitting signals having a marking impulse corresponding to the particular key closed meter 76 should just fail to register a deflection with the orientation mechanism in the position which has been determined. With this adjustment of the orientation mechanism the pointer 94 should be in the vicinity of the graduation marked 100 on the fixed scale 97. This is the zero reference position for the ends of marking signals and the right-hand movable scale 102 should be adjusted to bring its zero graduation into registration with the indicator line 96 on pointer 94.

Since the zero reference position for the beginning of a marking impulse is determined by causing the brushes 62 to be just leaving a numbered segment of the receiving distributor at the time that the marking impulse begins and the zero reference position for the end of a marking impulse is determined by causing the brushes 62 to be just moving into engagement with a numbered segment as the marking impulse ends, it will be apparent that the angular distance between the two zero reference positions is equal to the angle corresponding to 100 per cent of a perfect signaling impulse plus the angle occupied by a numbered segment. Thus if one zero reference position happened to coincide with the zero graduation on the fixed scale 97, the other zero reference position would be beyond the graduation numbered 100 on that scale by an amount equal to the angle occupied by a numbered segment. This might seem to introduce an error and does in fact establish zero reference positions which are farther apart than the angle through which brush arm 61 rotates during the reception of a perfect signaling impulse but, as will be set forth hereinafter, the same method is employed for determining the beginning and end of signals which are to be measured for distortion, the same factor of apparent error enters into those measurements and thus has no effect upon their accuracy and no correcting or compensating factor need be applied to the data obtained from such measurements. However, it is desirable that the numbered segment of the receiving distributor shall be as short as possible consistent with obtaining a satisfactory deflection of meter 76, in order that the angle between the two zero reference positions shall exceed 100 per cent of a pulse length by as little as possible.

It will be noted that when adjusting the orientation mechanism to determine the end of a marking signal, the brush arm 61 is in rotation throughout all of the start impulse and throughout all of the first impulse before brushes 62 encounter segment 1. This may bring the stop position of brushes 62 onto or in advance of the short "stop" segment. This is of no consequence because key 72 should never be closed when the zero reference position for the end of marking impulses is being determined. The reason for this is that the receiving device operates on the start-stop principle and the brush arm 61 is arrested before the end of the stop impulse, which coincides with the beginning of the start impulse, is received, so that no determination can be made regarding the end of the stop impulse. Thus, even though the stop position of brushes 62 is in advance of the stop segment the conductive path from the right-hand side of battery 73 to the right-hand side of condenser 78 will probably be closed at the time brushes 62 traverse the stop segment since presumably at that time the start impulse will be in process of being received. The charging circuit for condenser 78 will not be completed when brushes 62 traverse the stop segment because key 72 will be open.

After the signal measuring device has been calibrated by determining the zero reference positions, the apparatus is in condition for measuring distorted signals. As is well known, telegraph signals may be affected by three general types of distortion, namely, bias, characteristic distortion and fortuitous distortion. These types of distortion may either increase the length of marking impulses or decrease the length of marking impulses, an increase in length being referred to as marking distortion and a decrease in length being referred to as spacing distortion.

Bias in a signal affects the relationship between the beginning of the start impulse immediately preceding a signal train and the beginning of all subsequent marking impulses of the signal train. Thus a marking bias decreases the time from the beginning of the start impulse to the beginning of any subsequent marking impulse of the signal train and a spacing bias increases the time from the beginning of the start impulse to the beginning of any marking impulse in the signal train, the standard of comparison for determining whether a decrease or increase in the interval between the beginning of the start impulse and the beginning of any subsequent marking impulse has occurred being the interval between the beginning of the start impulse and the beginning of a corresponding marking impulse of a signal train having zero bias. The increase or decrease in the case of bias is uniform for the several impulses affected.

Characteristic distortion or fortuitous distortion differ from bias and may effect a change in the relationship between the beginning of the start impulse and the end of succeeding marking selecting impulses, and in the case of these types of distortion the stop impulse is not affected. A marking distortion of these types increases the time from the beginning of the start impulse to the end of any marking selecting impulse of a signal train and a spacing distortion of these types decreases the time from the beginning of the start impulse to the end of any marking selecting impulse of the signal train. The standard of comparison for determining whether a decrease or increase in the interval between the beginning of the start impulse and the end of a marking selecting impulse has occurred is the interval between the beginning of the start impulse and the end of a corresponding marking selecting impulse of a signal train having zero distortion. The foregoing definitions of bias and distortion furnish the information by means of which measurements made with the signal measuring device according to the present invention may be interpreted.

The increase or decrease in the case of characteristic distortion or fortuitous distortion may not be, and usually is not, uniform for the several impulses affected.

Assume now that the characteristics of signals transmitted over line 109 are to be determined. Plug 107 is inserted into jack 108 and key 83 is restored to the condition shown in Fig. 2 with the swingers of the key engaging the inner contacts thereof whereby the test transmitter 106 is disconnected from the operating winding of line relay 81 and line 109 is connected to the relay. If predetermined test signals, such as the letter R which has the second and fourth impulses marking, or Y which has the first, third and fifth impulses marking, are being transmitted from the transmitter 112, the keys 67, 69 and 72 may be closed for measuring the beginning of the second and fourth impulses of the letter R and the beginning of the stop impulse or the keys 66, 68 and 71 may be closed for measuring the beginning of the first, third and fifth impulses of the letter Y. The beginning of the stop impulse following the code combination for the letter Y cannot be determined because the marking condition of the fifth impulse and of the stop impulse are continuous and the beginning of the stop impulse is therefore indeterminable. If miscellaneous matter signals are being transmitted from the transmitter 112 only one of the keys 66, 67, 68, 69 or 71 should be closed since such signals will in all probability have in certain of the codes, two or more successive marking signals and the beginning of the second of two such signals or the end of the first of two such signals cannot be determined.

Assuming that it is desired to determine first whether the signals being received over the line 109 are biased, crank 60 is rotated to move support 32 for stop gate 34 in clockwise direction until indicator line 96 on pointer 94 is substantially in registry with the zero graduation of the left-hand movable scale 102 and the swinger of key 75 is brought into engagement with its right-hand contact. If with the orientation mechanism so adjusted the meter 76 registers deflection, it is indicated that whereas during the calibrating operation marking impulses did not begin until after the brushes 62 had left the numbered segments of the receiving distributor, these impulses now begin before the brushes 62 have left the numbered segments. This indicates that in the signal being received the time interval between the beginning of the start impulse and the beginning of marking impulses has been reduced, which is a marking bias condition. In order to readjust the orientation mechanism until the meter 76 fails to produce a deflection in response to these signals, it is necessary to bring the stop position of the brushes 62 closer to the segment I. This is accomplished by rotating the crank 60 to move the stop gate supporting member 32 in clockwise direction. It should be so moved until the meter 76 just fails to register deflection and the crank 60 may be rocked back and forth in order to ascertain carefully the exact position of the orientation mechanism at which this fails to occur. When the exact position of the orientation mechanism has been determined, the distance of the indicator line 96 of pointer 94 from the zero graduation of the left-hand movable scale 102 is read directly from that movable scale and that reading is a direct indication of marking bias in percentage of an impulse length.

If when the orientation mechanism was adjusted to bring the pointer substantially to the zero reference position, the meter 76 had produced no deflections, this would have indicated that the time interval between the beginning of the start impulse and the beginning of a marking impulse had not been increased but possibly had been decreased which, according to the definition, would be a spacing bias condition. Under these circumstances, it is necessary to rotate stop gate supporting member 32 in counter-clockwise direction by means of crank 60 to increase the distance from the stop position of brushes 62 to the end of segment 1 in order to cause the brushes 62 to be traversing a numbered segment at the time of receipt of the beginning of a corresponding marking impulse. When this has been done the meter 76 will produce the deflection whereupon the orientation mechanism may be backed off until the deflections just fail. The indicator line 96 of pointer 94 will now be at the right of the zero graduation on the left-hand movable scale 102 and its position as read from the scale 102 will afford a reading of the magnitude of the spacing bias in percentage of an impulse length. It is to be noted that the left and right-hand portions of the left-hand movable scale 102 may be marked M and S respectively, to indicate marking and spacing bias respectively, so that all necessary information as to the nature and magnitude of the bias may be read from the movable scale.

Following the determination of whether the marking impulses have been affected by marking or spacing bias, crank 60 is operated to move pointer 94 in counter-clockwise direction until its indicator line 96 substantially registers with the zero graduation of the right-hand movable scale 102 and key 75 is shifted to the left-hand contact. If it is found that with the orientation mechanism in this position meter 76 produces deflections, it will be known that the interval between the beginning of the start impulse and the end of marking selecting impulses has been increased so that those impulses instead of terminating just before brushes 62 reach the numbered segments, terminate after the brushes have entered among the segments. In accordance with the definition this is a condition of marking distortion, which may be either characteristic or fortuitous, and it is necessary to increase the distance between the stop position of the brushes 62 and the segment 1 in order to cause the brushes to enter upon a numbered segment just after the termination of a marking impulse. The pointer 94 is thus moved to the right of the zero graduation of the right-hand movable scale 102 and the position of the indicator line 96 of pointer 94 with respect to the right-hand movable scale 102 when meter 76 just fails to register deflection, affords a direct reading of the magnitude of marking distortion in percentage of impulse lengths.

If instead of producing deflection when the orientation mechanism was moved to bring the pointer to the right-hand zero reference position, the meter 76 had produced no deflection, it would be apparent that the time interval between the beginning of the start impulse and the end of a marking impulse had been decreased, which is a spacing distortion condition. Under these circumstances it is necessary to move the stop position of brushes 62 nearer to the beginning of segment 1 so as to reduce the travel of the brushes from the stop position to the first numbered segment. When the orientation mechanism has been moved in clockwise direction by means of crank 60 until meter 76 shows deflection has been backed off until the meter just fails to produce deflection, the indicator line 96 of pointer 94 will be at the left of the zero graduation of the right-hand movable scale 102 and the position of the pointer line with reference to the scale will afford a direct reading of the spacing distortion in percentage of an impulse length. The left and right-hand portions of the right-hand movable scale 102 may be marked S and M respectively, to indicate spacing or marking distortion respectively.

Since it is desirable to measure signal bias or distortion with considerable accuracy, it is desirable that the numbered segments shall be dimensioned and positioned accurately within plus or minus one per cent. Figs. 3, 4, 5 and 6 show two different embodiments of distributor rings that are contemplated by this invention. The distributor shown in Figs. 3 and 4 corresponds to that shown in Fig. 1. As shown in Fig. 3, the support for the continuous and segmented rings 63 and 64 is an annulus 105 of non-conductive material and may be molded from a thermo-setting resin or may be cut from a sheet of laminated textile material impregnated with a phenol plastic. The numbered segments and the "stop" segment have threaded shanks which extend through holes drilled or molded in the annulus 105 and are secured to the annulus by nuts which engage the threaded shanks. The intervening segments, which may be conductive or non-conductive and are spaced from the numbered segments, may have threaded holes that are entered by screws from the underside of the annulus 105 for securing the long electrically isolated segments to the annulus. The continuous conductive ring 63 may also be secured to the annulus 105 by screws except that it should have one stud extending below the lower surface of annulus 105 to which the conductor 74 (Fig. 1) may be secured as by soldering. The conductors for the numbered segments and the "stop" segment may be soldered to the studs by which the segments are secured to the annulus.

In the embodiment of the receiving distributor shown in Figs. 5 and 6, an annulus 116 is preferably molded of a thermo-setting resinous material, and in the molding process recesses of the exact size of the numbered segments and the "stop" segment and in the positions in which those segments are to be located, are formed. Also, an annular groove is produced in the annulus 116 during the molding process to receive the continuous conductive ring 63. The location and dimensions of the recesses and grooves can be accurately controlled in die molding processes of the type usually employed in the production of articles from thermo-setting resinous materials. After the annulus has been thus produced the short segments are introduced into the recesses and each recess is provided with a hole through which a threaded shank of the conductive segment may extend. Preferably the continuous conductive ring 63 also has threaded shanks. Nuts are threaded onto all of the threaded shanks to secure the conductive members firmly to the annulus 116, and the electrical circuit conductors are soldered to the studs. The thickness of the continuous conductive ring 63 and of the numbered segments and the stop segment is such that they project just slightly above the upper surface of annulus 116. With this arrangement the inner brush 62 always engages the surface of continuous conductive ring 63 but the outer brush 62 when leaving the surface of one of the short conductive segments moves into surface engagement with the non-conductive annulus 116 and traverses that surface until it encounters the next conductive segment, whereupon it moves up onto the slightly elevated surface of the conductive segment, traverses that segment and drops back down on the surface of annulus 116 after leaving the segment.

Although certain specific embodiments of the invention have been shown herein and described in the foregoing specification, it is to be understood that the invention is not limited to such specific embodiment but is capable of modification and rearrangement without departing from the spirit of the invention and within the scope of the appended claims.

What is claimed is:

1. In a telegraph signal measuring set, a signal responsive line relay, a start-stop receiving distributor associated with said relay including a brush arm having variable stop positions, means for varying said stop positions to cause said brush arm to occupy predetermined instantaneous positions at signal responsive transits of said relay, means for indicating visually said stop positions, and a variably positionable scale for identifying various positions of said indicating means as zero reference points.

2. In a telegraph signal measuring set, a signal responsive line relay, a start-stop receiving distributor associated with said relay including a brush arm having variable stop positions, means for varying said stop positions to cause said brush arm to occupy predetermined instantaneous positions at impulse-beginning transits of said relay and at impulse-ending transits of said relay, means for indicating visually said stop positions, and variably positionable scales for identifying various positions of said indicating means as zero reference points for impulse-beginning transits and for impulse-ending transits.

3. In a telegraph signal measuring device, a signal responsive relay, a start-stop distributor controlled by said relay, an indicator controlled jointly by said relay and said distributor for indicating signaling impulse transitions, means for varying the orientation of said distributor to control the operation of said indicator, an orientation adjustment indicator, and a scale for registering the position of said orientation adjustment indicator, said scale being variably positionable for indicating various positions of said orientation adjustment indicator as zero reference points.

4. In a telegraph signal measuring device, a signal responsive relay having two armature transit directions corresponding to two types of signaling impulses, a start-stop distributor controlled by said relay, an indicator controlled jointly by said relay and said distributor for indicating signaling impulse transitions, switching means for rendering said indicating means responsive to one or the other of said relay armature transit directions, means for varying the orientation of said distributor to control the operation of said indicator, an orientation adjustment indicator, and a scale for registering the position of said orientation adjustment indicator, said scale being movable for varying the zero reference position of said orientation adjustment indicator.

5. In a telegraph signal measuring device for measuring signals comprising a plurality of impulses, a signal responsive relay, a start-stop distributor controlled by said relay, an indicator controlled jointly by said relay and said distributor for indicating signaling impulse transitions, selectively operable switching means for rendering said indicator responsive to any one or more of the impulses of said signals, means for varying the orientation of said distributor to control the operation of said indicator, an orientation adjustment indicator, and a scale for registering the position of said orientation adjustment indicator, said scale being movable for varying the zero reference position of said orientation adjustment indicator.

6. In a telegraph signal receiving device, a rotatable impulse distributor, means for arresting said distributor after each revolution thereof, an electromagnet energizable to lock said arresting means, and means for estopping the energization of said electromagnet except when said distributor has closely approached its arrestment position.

7. In a telegraph signal receiving device, a signal responsive line relay, a rotatable signaling impulse distributor for distributing impulses under the control of said line relay, means for arresting said distributor at the end of each revolution thereof, an electromagnet energizable to lock said distributor arresting means in effective position, said electromagnet being energizable under the control of said signal responsive relay, and means for estopping the energization of said electromagnet under the control of said relay except when said distributor is closely approaching its arrestment position.

8. In a telegraph signal receiving device, a signal responsive relay, a signaling impulse receiving distributor for distributing signaling impulses received by said relay, means for arresting said distributor at the end of each revolution thereof, an electromagnet energizable to lock said arresting means in effective position and deenergizable to release said arresting means, said electromagnet being energizable under the control of said line relay, and means for estopping the energization of said electromagnet under the control of said relay except when said distributor is closely approaching its stop position.

9. In a signal receiving device, a signal responsive relay, a rotatable instrumentality for distributing signaling impulses received by said relay, means for arresting said instrumentality at the end of each revolution thereof, an electromagnet energizable to lock said arresting means in effective position and deenergizable to release said arresting means, means for varying the position of said arrestment means to vary the stop position of said distributor, an energizing circuit for said electromagnet including the contacts of said relay and other contacts, means carried by said distributor for closing said other contacts, and means carried by said arrestment position varying means for supporting said other contacts to cause said contacts to be closed by said closing means only when said distributor is closely approaching said arresting means irrespective of the position of said arresting means.

10. In a signal receiving device, a signal responsive relay, a signaling impulse receiving distributor including stationary continuous and segmented conductive rings and a rotatable brush arm, means for arresting said brush arm at the end of each revolution thereof, an electromagnet energizable to condition said arresting means to arrest said brush arm and deenergizable to release said arresting means, means movable about the axis of said rotatable brush for supporting said arresting means to vary the arrestment position of said brush arm, an energizing circuit for said electromagnet including the contacts of said relay and other contacts, said other contacts being carried by said movable supporting means so as to be variable in position proportional to said arresting means, and a cam associated with said brush arm for closing said other contacts when said brush arm closely approaches the position of arrestment irrespective of the position of said arresting means for preparing an energizing circuit for said electromagnet.

11. In a telegraph signal measuring set, a signal responsive relay, a start-stop distributor associated with said relay including a continuous conductive ring, a segmented ring and a brush arm having variable stop positions, means for varying said stop positions to cause said brush arm to occupy predetermined instantaneous positions relative to the segments of said segmented ring at impulse beginning transits and impulse ending transits of said relay, an indicator arm and a stationary graduated scale for indicating visually said stop positions, and a pair of graduated scales which are varibly positionable with respect to said stationary scale for designating as zero reference points the stop positions which produce said predetermined instantaneous positions for both impulse beginning transits and impulse ending transits of said relay.

12. In a telegraph signal measuring system, the method of determining the beginning and end of impulses which comprises receiving telegraph impulses, distributing the received impulses to conductive segments through a registering device, and causing the beginning or end of distributed impulses to just fail from a time standpoint to arrive at their segments through said registering device.

WILMARTH Y. LANG.